United States Patent [19]

Yamazaki

[11] Patent Number: 4,790,631
[45] Date of Patent: Dec. 13, 1988

[54] LIQUID CRYSTAL DEVICE WITH FERROELECTRIC LIQUID CRYSTAL ADAPTED FOR UNIPOLAR DRIVING

[75] Inventor: Shunpei Yamazaki, Tokyo, Japan

[73] Assignee: Semiconductor Energy Laboratory Co., Ltd., Kanagawa, Japan

[21] Appl. No.: 140,202

[22] Filed: Dec. 31, 1987

[30] Foreign Application Priority Data

Jan. 5, 1987 [JP] Japan .................. 62-302
Jan. 5, 1987 [JP] Japan .................. 62-303

[51] Int. Cl.⁴ .......................... G02F 1/13
[52] U.S. Cl. .................. 350/336; 350/333; 350/350 S
[58] Field of Search ............ 350/333, 336, 350 S

[56] References Cited

U.S. PATENT DOCUMENTS

| | | | |
|---|---|---|---|
| 4,277,786 | 7/1981 | Waldron | 350/336 X |
| 4,429,955 | 2/1984 | Portmann | 350/336 X |
| 4,639,089 | 1/1987 | Okada et al. | 350/350 S X |
| 4,655,561 | 4/1987 | Kanbe et al. | 350/350 S |
| 4,664,480 | 5/1987 | Geary et al. | 350/350 S X |
| 4,684,218 | 8/1987 | Aizawa et al. | 350/336 X |
| 4,712,876 | 12/1987 | Umeda et al. | 350/350 S |
| 4,714,323 | 12/1987 | Katagiri et al. | 350/350 S |

Primary Examiner—Stanley D. Miller
Assistant Examiner—Richard Gallivan
Attorney, Agent, or Firm—Gerald J. Ferguson, Jr.

[57] ABSTRACT

A liquid crystal device can be controlled by applying a positive (or negative) voltage to certain pixels and by removing the applied voltage through a main electrode arrangement in the form of a matrix. The liquid crystal layer embodying the liquid crystal device is entirely subjected, during operation, to a reverse electric field by a reverse voltage applied to an adjunct electrode arrangement. With this structure, each pixel defined in the liquid crystal layer is always subjected to an electric field so that a highly stabilized operation can be realized.

4 Claims, 1 Drawing Sheet

LIQUID CRYSTAL DEVICE WITH FERROELECTRIC LIQUID CRYSTAL ADAPTED FOR UNIPOLAR DRIVING

BACKGROUND OF THE INVENTION

This invention relates to a liquid crystal device with a ferroelectric liquid crystal adapted for unipolar driving.

In prior art, a liquid crystal device using a ferroelectric chiral smectic liquid crystal (FLC) comprises a pair of transparent substrates, a liquid crystal layer disposed between the substrates, an electrode arrangement in the form of pixels to apply electric field to the liquid crystal layer, and a polarizing plate provided on the disc. The liquid crystal layer change in its optical characteristics in accordance with the direction of electric field perpendicularly applied to pixels. With the polarizing plate and in the light of the anisotropic absorption by the liquid crystal layer whose anisotropic direction is changed in accordance with the direction of the applied electric field, the transparency of each pixel of the liquid crystal device can be controlled by applying an electric field of a suitable direction to the pixel. As a driving method for such a liquid crystal device, "AC driving method" is well-known in the art. According to this method, in advance of applying an electric field to a particular pixel to reverse the dipole moment of liquid crystal at the pixel, a weak electric field is applied in the reverse direction with a finely control of the duration and strength.

The liquid crystal layer used in such a liquid crystal device exhibits an apparent hysteresis. Namely, the optical characteristics of the liquid crystal can be kept even after removal of an applied electric field, until an opposed electric field stronger than a certain level, i.e., called a coersive electric field (Ec). Nonetheless, the liquid crystal itself does not have inherent hysteresis. The apparent hysteresis can be understood by taking into consideration the interaction between the inside surfaces of the substrates and the liquid crystal. From this mechanism, such a liquid crystal layer is called SSFLC (Surface Stabilized Ferroelectric Liquid Crystal). However, the Ec is faint so that the driving method of a liquid crystal device becomes complex, and that it is difficult to produce a grey scale.

SUMMARY OF THE INVENTION

It is therefore an object of the invention to provide a liquid crystal device capable of a stabilized operation.

It is another object of the invention to provide a liquid crystal device which can be driven in terms of whether or not positive (or negative) voltage is applied to pixels.

It is a further object of the invention to provide high contrast capability for liquid crystal device.

It is a still further object of the invention to provide a liquid crystal device capable of displaying grey scale.

In order to accomplish the above and other objects, a liquid crystal device is provided on the opposite sides of a liquid crystal layer with a pair of adjunct electrodes which is arranged to subject the liquid crystal layer to an electric field induced between the substrates. The optical condition of the liquid crystal layer can be maintained uniformly throughout the layer in light of the electric field. A number of certain pixels are changed in optical condition by applying a reverse voltage to a main electrode arrangement in the form of a matrix.

DETAILED DESCRIPTION OF THE PREFERRED EMBODIMENTS

Figure 1A:
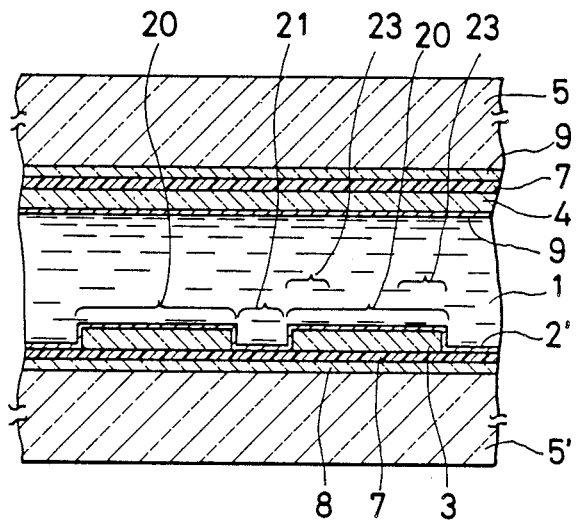
FIG. 1(A) is a cross section view of a liquid crystal device in accordance with the present invention.

Referring to FIG. 1(A), a liquid crystal device in accordance with the invention is illustrated. In the figure, the liquid crystal device, such as a display, comprises a pair of transparent substrates 5 and 5', a plurality of first main electrode strips 4 of a transparent conductive material formed on the substrate 5 and extending in the lateral direction, a plurality of second main electrode strips 3 of a transparent material formed on the substrate 5' and extending in the direction normal to the plane of the drawing, a ferroelectric liquid crystal layer interposed between the substrates 5 and 5', and orientation control films 2 and 2' of a nylon or a polyimide provided on the substrates 5 and 5'. The device is further provided with a first adjunct transparent electrode 9 and a second adjunct transparent electrode 8, both being located outside the main electrode strips. Interposed between the first electrode strips 4 and the first adjunct electrode 8 and between the second electrode strips 3 and the second adjunct electrode 8 are insulating films 7 of e.g., silicon oxide, silicon nitride or alumina formed by sputtering. The inner surfaces contacting the liquid crystal layer are provided to constrain the director of the liquid crystal to be parallel thereto, but free to reorient in the surface plane. In this structure, each pixel on the liquid crystal layer defined by the first and second electrode strips and adjunct electrodes is subjected to the electric field and has its state of the two stable states. In the figure, only a sectional view of a 2×2 matrix is illustrated. The thickness of the liquid crystal layer is 1-4 microns.

By applying a bias voltage between the adjunct electrodes 8 and 9, all the pixels on the liquid crystal layer are unified in one state which is determined in accordance with the sense of the applied voltage. With this bias application to the adjunct electrodes, the states of the certain pixels can be changed by applying a high voltage between the inside electrode strips 3 and 4 whose intersection are the addressed pixels. The liquid crystal layer looks as if it is endowed with a spontaneous electric field and the stability relies not on the contiguous inner surfaces but on the internal electric field, unlike the SSFLC. From this, the driving method is named the Internal Electric Field Stabilized Method, or IFS for short. In accordance with the differential voltage between the voltage applied to the adjunct electrodes and the voltage applied to first and second electrode strips constituting the particular pixel in the intersection, the proportion of the reversed area on the pixel can vary and the pixel can be grey.

Next, the liquid crystal device according to the invention is illustrated along one example of its process.

In what follows, each element is designated by a number same as the respective number shown in FIG. 1(A) for facilitating understanding. A pair of glass substrate 5 and 5' is deposited on the inside surfaces with indium tin oxide (ITO) by sputtering to form a pair of opposite adjunct electrodes 8 and 9 having a thickness between 300–1000 Å, preferably 800 Å, the sheet resistance being 300–100 ohm/cm². On the both inside surfaces of the electrodes 8 and 9 are coated 1500 Å thick insulating films of a polyimide by spincoating with 1500 Å. Further, a 2500 Å ITO film is deposited on each inside of the insulating films and treated by a known photolithography to produce a desired pattern of main electrode strips. The patterns for the main electrode strips 3 and 4 on the substrates 5 and 5' are coordinated to constitute a matrix structure with 1 mm×1 mm intersections. The interval 21 between the adjacent strips 20 is 25 microns. Then, the most inner surfaces of the substrates 5 and 5' are covered with polyimide films 2 and 2', only one of which is given rubbing treatment to produce an orientation surface. After such treatment, the substrates are cleaned and dried.

The substrate 5 and 5' are then mated in a spaced relation with a sealing member at the periphery except an access, through which the space between in between is filled with a liquid crystal at an elevated temperature, e.g., 150° C. If a voltage of 10–30 V, e.g., 20 V is applied between the adjunct electrodes 8 and 9 during the filling step of liquid crystal and, preferably until the liquid crystal is cooled, a uniformly well-aligned liquid crystal layer can be obtained. The distance between the substrates is chosen so that the thickness of the liquid crystal layer is 2 microns. The liquid crystal is a blend of an ester and a FLC derived with biphenyl, or any one described in Japanese Patent Published Applications Nos. sho 56-107216, 59-98051 and 59-118744.

When application of −10 V between the adjunct electrodes 8 and 9, all the pixels and the interval therebetween become opaque (or become transparent depending on the orientation of the associated light-polarizing plates). Then, a +20 V application, in addition to the −10 V application, between the main electrode strips 3 and 4 which address a certain pixel, only the addressed pixel becomes transparent. When the +20 V application is removed, the pixel becomes opaque again by virtue of the electric field induced by the background −10 V application between the adjunct electrodes. Namely, the liquid crystal device can be driven by "unipolar driving" in terms of whether or not a negative (or positive) voltage is applied. In order to make the response quick, the magnitude of the voltage applied to the adjunct electrodes 8 and 9 may be increased a little just after the removal of the application to the main electrode strips maintaining pixels in transparent condition.

Alternatively, the films 2 and 2' can be made from a ferroelectric material so that the liquid crystal layer can be subjected to the electric field induced by the dipole moment thereof.

With such structure, a liquid crystal display with 720×480 pixels arranged with black spaces in between can be controlled by unipolar driving without crosstalk. In this embodiment, the adjunct electrodes 8 and 9 are provided outward of the main electrode strips 3 and 4. However, one or both of them can be placed inside of the main electrode strips or located on the spaces laterally between the electrode strips.

Figure 1B:
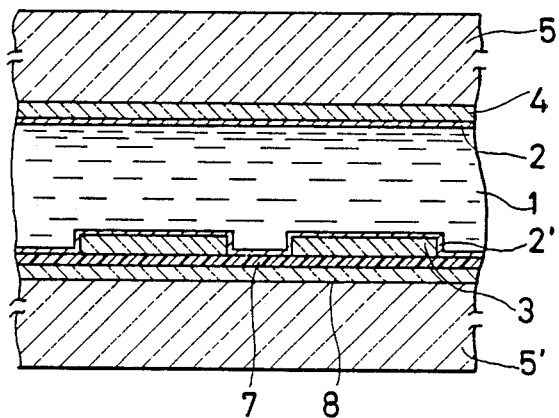
FIG. 1(B) is a section view showing another embodiment in accordance with the present invention.

FIG. 1(B) is a cross sectional view showing another embodiment in accordance with the present invention. In this figure, only one adjunct electrode 8 is provided below the matrix-shaped main electrodes 3 and an insulating film 7. The voltage application for IFS is applied between the other main electrode 4 and the adjunct electrode 8.

The invention is not limited to the above particular embodiment and many modifications and variations may cause to those skilled in the art. The invention can be applied to, e.g., disc memories, printer, speakers, and shutters having an image sensor.

I claim:

1. A liquid crystal device comprising:
   a pair of substrates, at least one of which is transparent;
   a layer of ferroelectric liquid crystal interposed between said substrates having two stable states;
   an adjunct electrode arrangement for inducing an electric field normal to said substrate in said liquid crystal layer, in order that said liquid crystal layer be in one of of said states; and
   a main electrode arrangement for selectively inducing a reverse electric field in at least one of the pixels which are defined by said main electrode arrangement and change the state of the pixel subjected to said reverse electric field.

2. The device of claim 1 wherein said main electrode arrangement comprises a plurality of first conductive strips extending parallel in one direction on the inside surface of one of said substrates, and a plurality of second conductive strips extending parallel in the perpendicular direction to said first conductive strips to form a matrix structure with said first conductive strips.

3. The device of claim 2 wherein said adjunct electrode arrangement comprises a first conductive film underlying said first conductive strips and a second conductive film underlying said second conductive strips.

4. The device of claim 1 wherein said main electrode arrangement comprises a first conductive pattern formed on one of said substrates and a second conductive pattern formed on the other substrate, and said adjunct electrode arrangement comprises a third conductive pattern underlying said first conductive pattern on said one substrate and said second conductive pattern shared with said main electrode arrangement.

* * * * *